United States Patent [19]
Ouchi et al.

[11] Patent Number: 6,034,846
[45] Date of Patent: *Mar. 7, 2000

[54] COMPLEX MAGNETIC HEAD HAVING UPPER AND LOWER RANK CORE CHIPS AND METHOD FOR MANUFACTURING THE SAME

[75] Inventors: Hirofumi Ouchi; Yoshio Kasuga; Masao Kouhashi; Tatsunori Hibara; Hiromasa Ishii; Seiichi Handa; Hiroshi Kobayashi, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,963

[22] Filed: Aug. 6, 1997

[30] Foreign Application Priority Data

Dec. 13, 1996 [JP] Japan ..................... 8-333885

[51] Int. Cl.[7] .................................................. G11B 5/265
[52] U.S. Cl. .............................................................. 360/121
[58] Field of Search ............................ 360/119, 120, 360/121, 122, 103

[56] References Cited

U.S. PATENT DOCUMENTS

| | | | |
|---|---|---|---|
| 4,851,942 | 7/1989 | Kumasaka et al. | 360/103 |
| 4,912,582 | 3/1990 | Gomi et al. | 360/103 |
| 5,151,837 | 9/1992 | Wakasugi et al. | 360/103 |
| 5,181,150 | 1/1993 | Hayakawa et al. | 360/121 |
| 5,184,393 | 2/1993 | Saito et al. | 360/122 |
| 5,309,306 | 5/1994 | Okada et al. | 360/121 |

FOREIGN PATENT DOCUMENTS

| | | |
|---|---|---|
| 63-103408 | 5/1988 | Japan . |
| 2-189706 | 7/1990 | Japan . |
| 3-263602 | 11/1991 | Japan . |
| 5-290348 | 11/1993 | Japan . |
| 5-298616 | 11/1993 | Japan . |

OTHER PUBLICATIONS

"120MB Large Capacity Floppy Disk Drive with Backward R/W Compatibility" by M. Yamamoto et al., Technical Report of IEICE, MR95–68 (1995–12) pp. 1–8.

Primary Examiner—David D. Davis

[57] ABSTRACT

A complex magnetic head in which magnetically separated upper and lower rank core chips are spaced apart and connected to a support block made of a nonmagnetic material in such a way as to be in parallel with each other. Each of the upper and lower rank core chips have first, second and third cores. Magnetic gaps, whose track widths are different from each other, are provided between the first and second cores of one of the upper and lower rank core chips and between the second and third cores of the other of the upper and lower rank core chips, respectively.

7 Claims, 14 Drawing Sheets

COMPLEX MAGNETIC HEAD HAVING UPPER AND LOWER RANK CORE CHIPS AND METHOD FOR MANUFACTURING THE SAME

BACKGROUND OF THE INVENTION

1. Field of the Invention

This invention relates to a complex magnetic head, which is provided in a flexible disk drive (FDD) used in, for example, a computer, a personal computer and a portable information terminal device and is used to perform the magnetic recording of information onto a magnetic recording medium such as a magnetic disk or the magnetic reproduction of information therefrom, and to a method of manufacturing the complex magnetic head.

2. Description of the Related Art

Generally, the dominating FDDs are those which are ready for a 3.5-inch-diameter magnetic floppy disk (FD). Nevertheless, the storage capacity thereof has been 2 MB for many years. However, recently, the storage capacity required for image recording, graphic processing and speech processing of one file of data has exceeded 2 MB. Therefore, large capacity FDDs are needed. However, in view vast amount of date stored to the present on 2 MB FDs, such large capacity FDDs should be able to use 2 MB disk media (namely, should be compatible with lower rank or order FD's).

An example of such an FDD is the 120 MB FDD disclosed in "Shin-Gaku-Giho MR95-68" (published by the Institute of Electronics, Information and Communication Engineers of Japan in 1995). In the case of the multi-gap (magnetic) head of this 120 MB FDD, a 120 MB use core, whose track width is 8 $\mu$m, and a lower rank read/write (HD) use core, whose track width is 125 $\mu$m, are embedded in a U-shaped ceramic slider and are fixed by using fused glass.

Figure 23:
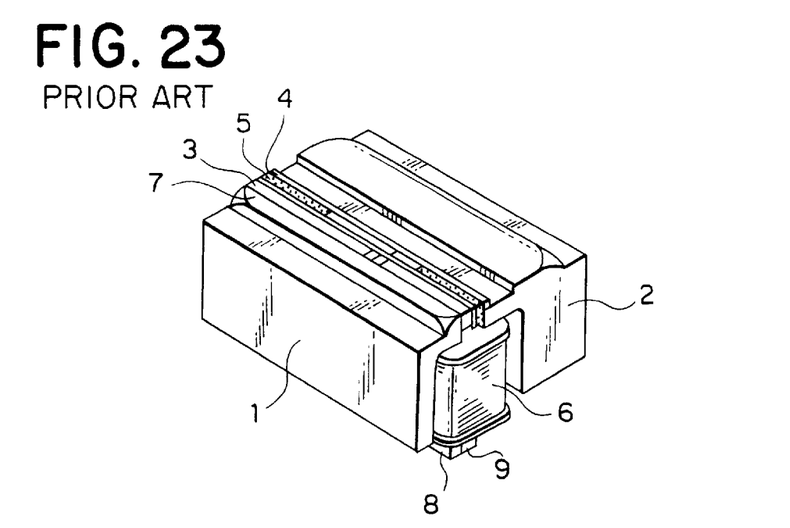
FIG. 23 is a perspective diagram illustrating an example of a conventional complex magnetic head.

Referring next to FIG. 23, there is shown a perspective view of a conventional complex magnetic head disclosed in, for instance, Japanese Laid-open Patent Publication No.3-263602. As shown in this figure, a lower rank core assembly 3, a higher rank core assembly 4 having a higher recording density than that of the lower rank core assembly 3, and a spacer plate interposed between these core assemblies 3 and 4 are placed between a pair of sliders 1 and 2. Further, a coil 6 is placed inside the sliders 1 and 2. Moreover, back cores 8 and 9 are connected to the edge portions of the core assemblies 3 and 4, which are opposite to a disk sliding surface.

Figure 24:
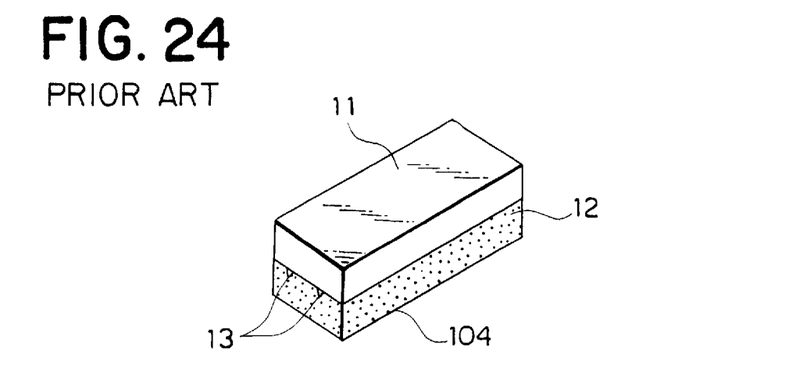
FIG. 24 is a perspective diagram illustrating the condition of the complex magnetic head of FIG. 23 in the middle of production thereof.
Figure 25:
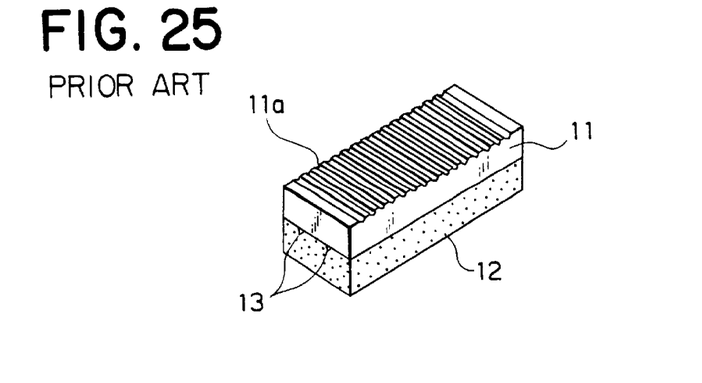
FIG. 25 is a perspective diagram illustrating a condition of the back (or latter) stage of the magnetic head of FIG. 24.

Next, a method of manufacturing the upper rank core assembly 4 of FIG. 23 will be described hereinbelow. First, as shown in FIG. 24, a magnetic material base 11 made of a high permeability magnetic material such as ferrite is joined by a cementing material 13 to a nonmagnetic material board 12 made of a nonmagnetic material such as a ceramic or a nonmagnetic ferrite. Subsequently, as shown in FIG. 25, a plurality of track grooves 11a are formed in a surface portion of the magnetic material base 11. Moreover, a winding groove 11b is formed in the magnetic material base 11 in such a manner as to extend perpendicular to the track grooves 11a.

Figure 26:
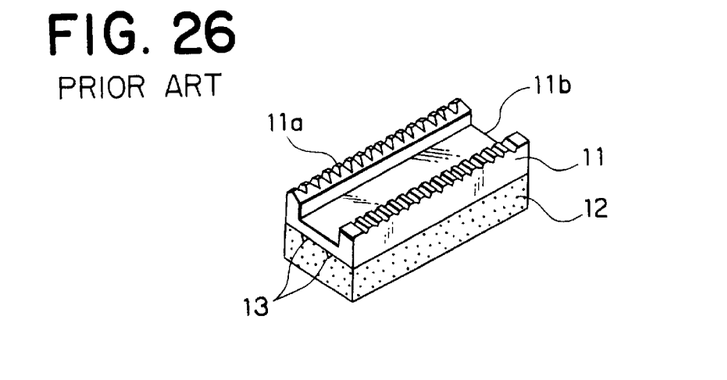
FIG. 26 is a perspective diagram illustrating a condition of the back stage of the magnetic head of FIG. 25.
Figure 27:
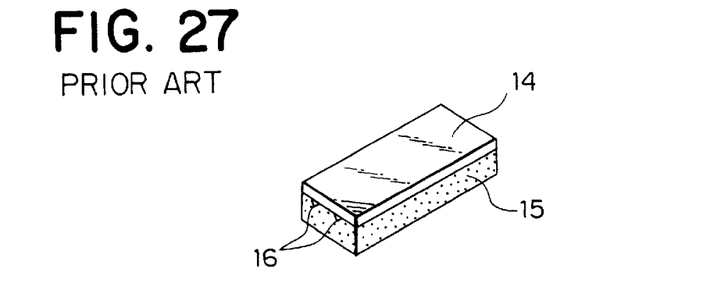
FIG. 27 is a perspective diagram illustrating a core block which is different from that of FIG. 24.
Figure 28:
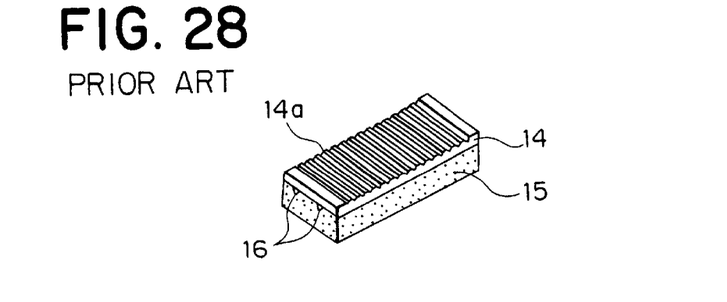
FIG. 28 is a perspective diagram illustrating a condition of the back stage of the magnetic head of FIG. 27.
Figure 29:
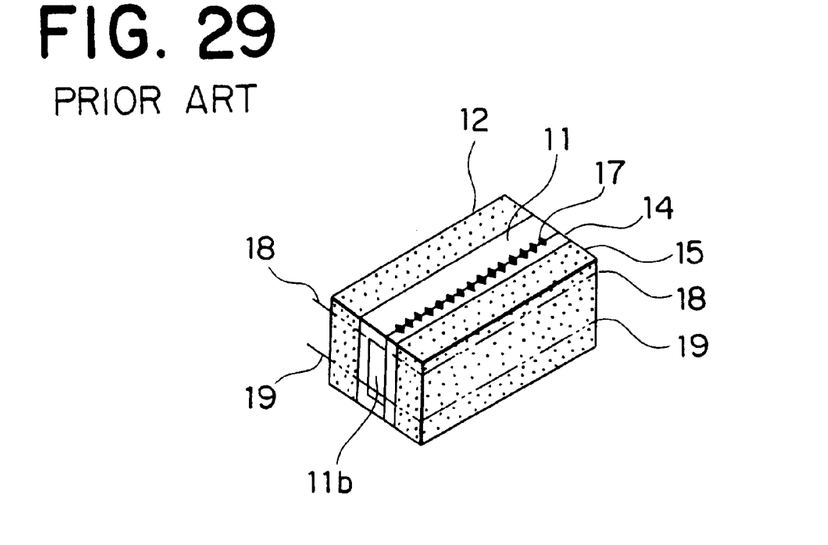
FIG. 29 is a perspective diagram illustrating a condition of the back stage of the magnetic head of FIGS. 26 and 28.

Meanwhile, as illustrated in FIG. 27, a magnetic material base 14 and a nonmagnetic material base 15, which are different in thickness from the corresponding magnetic material base and the corresponding nonmagnetic material base shown in FIG. 24, respectively, are joined together by a joining material 16. Further, as illustrated in FIG. 28, track grooves 14a are provided in a surface portion of the magnetic material base 14. Thereafter, thin films made of high saturation magnetic flux density materials such as Fe-Al-Si alloys are formed on the L-core block of FIG. 26 and the I-core block of FIG. 28, respectively, as needed, by performing a sputtering process or a vapor deposition process. Then, thin films made of $SiO_2$ and $CrO_2$ are provided so as to form a recording and reproducing gap. Subsequently, as illustrated in FIG. 29, the core blocks are butted in such a way as to align the track grooves of one of the core blocks with the corresponding track grooves of the other core block, respectively, and are joined together by a joining material 17, whose melting point is lower than those of the joining materials 13 and 16.

Figure 30:
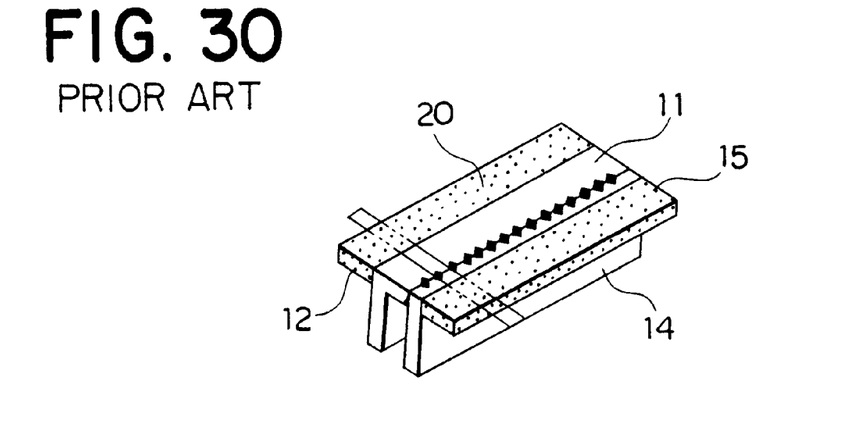
FIG. 30 is a perspective diagram illustrating a condition of the back stage of the magnetic head of FIG. 29.
Figure 31:
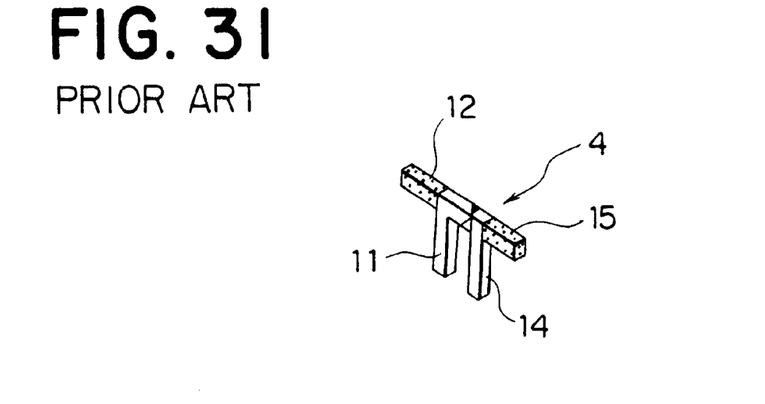
FIG. 31 is a perspective diagram illustrating a condition of the back stage of the magnetic head of FIG. 30.

The resultant core block obtained by joining the L-core block with the I-core block in this way is then cut along cutting lines 18 and 19 in such a manner as to have a shape as illustrated in FIG. 30. Moreover, the resultant core block is further cut along a cutting line 20 of FIG. 30 and finally undergoes lapping. Thus the upper rank core assembly 4 as illustrated in FIG. 31 is obtained.

In the case of the complex magnetic head as shown in FIG. 23, portions (indicated by reference numerals 12 and 15 in FIG. 31), which are unnecessary for forming magnetic circuits of the core assemblies 3 and 4, are made of nonmagnetic materials. Thereby, the crosstalk induced between the core assemblies 3 and 4 is reduced. Further, the presence of the nonmagnetic material portions 12 and 15 prevents the magnetic head from being damaged when a magnetic disk makes contact with the disk sliding surface 7.

Figure 32:
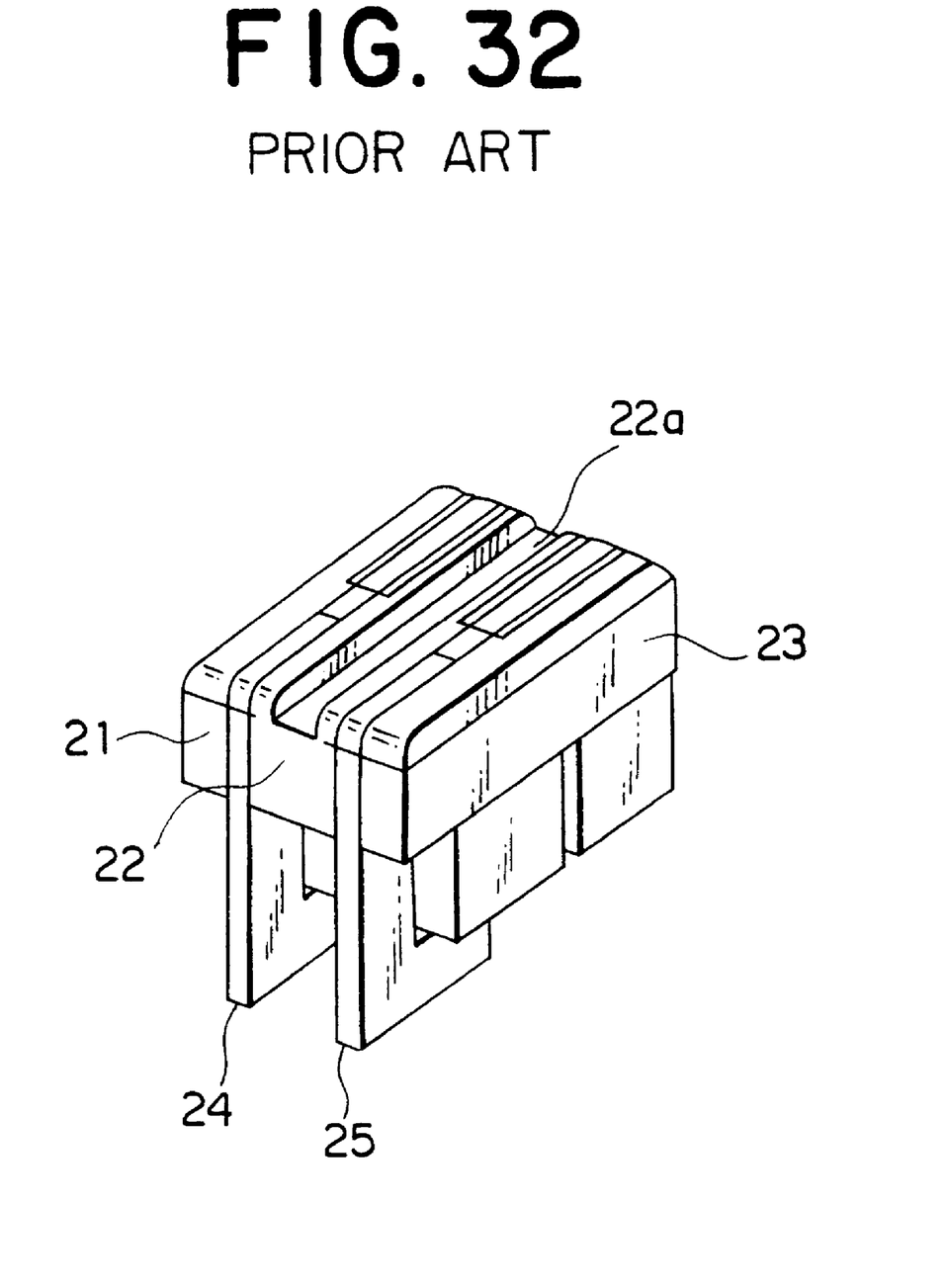
FIG. 32 is a perspective diagram illustrating another example of a conventional complex magnetic head.

Further, FIG. 32 is a perspective diagram illustrating a conventional complex magnetic head as disclosed in Japanese Laid-open Patent Publication No. 63-103408. Lower rank core assembly 24 and upper rank core assembly 25, which are different in gap length or core width from each other, are placed between a first slider 21 and a second slider 22 and between the second slider 22 and a third slider 23, respectively. Further, a groove 22a is provided in the surface portion of the second slider 22 placed between these core assemblies 24 and 25.

Thus, the core assemblies 24 and 25 are placed separately from each other across the groove 22a formed in the sliding surface portion of the second slider 22. Thereby, magnetic interference is prevented from being caused between the core assemblies 24 and 25.

In the case of the conventional complex magnetic head configured as described above, there is the necessity of assembling the lower rank core assemblies 3 and 24 and the upper rank core assemblies 4 and 25 by precisely positioning these assemblies after the lower rank core assemblies 3 and 24 are manufactured separately from the upper rank core assemblies 4 and 25. Thus, assembly facilities and jigs are costly, and assembly time is long.

Further, in the case of the complex magnetic head illustrated in FIG. 23, the magnetic gap is formed after the magnetic material bases 11 and 14 are joined to the nonmagnetic material bases 12 and 15, respectively. Thus, there is the possibility that a warpage or deformation occurs in the core blocks. Consequently, the uniformity of the gap length is degraded. Moreover, in the case of the complex magnetic head illustrated in FIG. 32, the core assemblies 24 and 25 are arranged to span the whole slider, so the inductance thereof is high. In response to this, especially, in the case of the upper rank core assembly 25 whose recording density is high, the impedance thereof is high owing to this increase in inductance. Consequently, the electromagnetic conversion performance of the magnetic head is degraded.

SUMMARY OF THE INVENTION

This invention was accomplished to solve the aforementioned problems of the conventional complex magnetic head and aims to provide a complex magnetic head, by which the number of parts can be reduced, the assembly thereof can be facilitated and the performance thereof can be enhanced, and to provide a method of manufacturing such a complex magnetic head.

A complex magnetic head of the present invention comprises a core assembly having a support block made of a nonmagnetic material, and further having upper and lower rank core chips spaced and fixed to the support block in such a manner as to be in parallel with each other, each of the upper and lower rank core chips having first, second and third cores, with magnetic gaps, whose track widths are different from each other, being provided between the first and second cores of one of the upper and lower rank core chips and between the second and third cores of the other of the upper and lower rank core chips, respectively; a pair of coils respectively inserted into the upper and lower rank core chips; and a pair of back cores respectively joined to the upper and lower rank core chips.

Moreover, a method of manufacturing a complex magnetic head of the present invention comprises the steps of: assembling a core material assembly having a track surface by joining first and third core materials, each of which has a "C" shaped section, to both surfaces of a plate-like second core material through gap materials; providing a plurality of track grooves, which extend in a direction perpendicular to a joint surface between the first and second core materials and a joint surface between the second and third core materials, in the core material assembly; fixing said core material assembly to a support block material made of a nonmagnetic material; cutting off a joint portion between the first and second core materials and a joint portion between the second and third core materials, the joint portions being opposite to the track surface; cutting the core material assembly into a plurality of core chips and further cutting the support block material into a plurality of core assemblies, each of which has two core chips; and mounting a pair of coils and a pair of back cores onto said core assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Hereinafter, the preferred embodiments of the present invention will be described in detail by referring to the accompanying drawings.

First Embodiment

Figure 1:
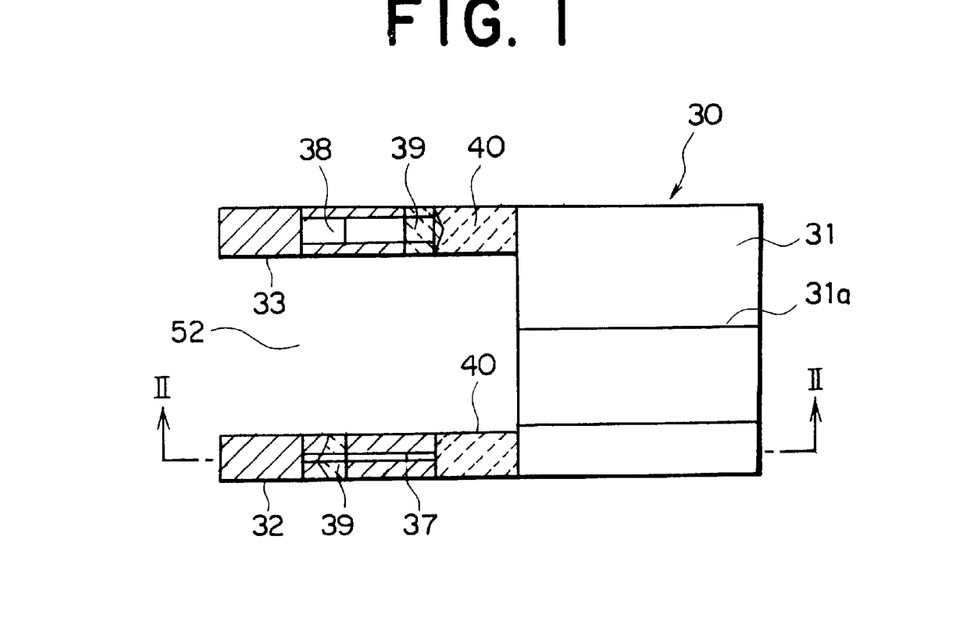
FIG. 1 is a plan view of a core assembly of a complex magnetic head embodying the present invention, namely, a first embodiment of the present invention.
Figure 2:
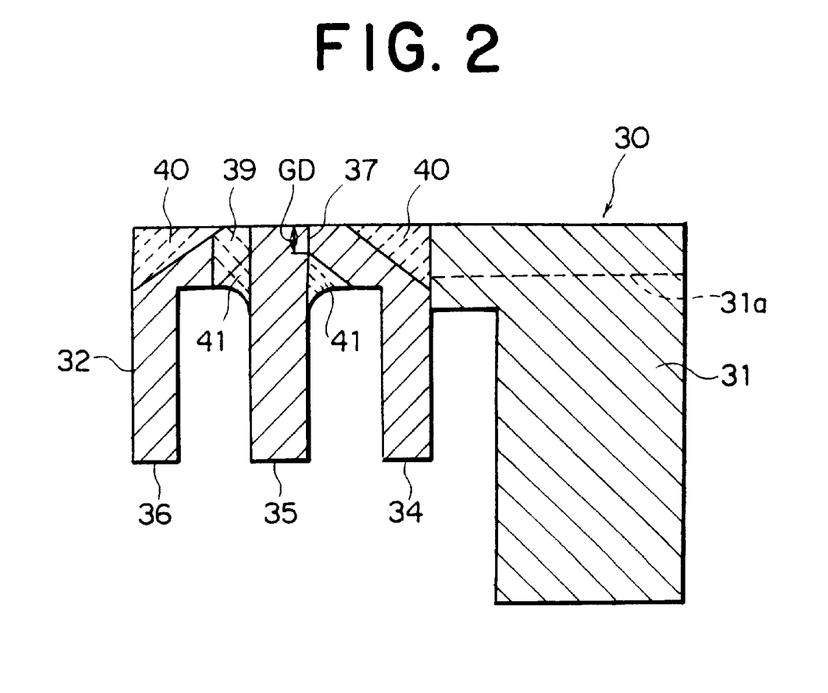
FIG. 2 is a sectional view taken on line II—II of FIG. 1.

FIG. 1 is a plan view of a core assembly of a complex magnetic head embodying the present invention, namely, the first embodiment of the present invention. FIG. 2 is a sectional view taken along line II—II of FIG. 1.

As shown in these figures, a core assembly 30 has: a support block 31 made of a nonmagnetic material such as a ceramic; and an upper rank core chip 32 and a lower rank core chip 33, which are spaced out and are connected to this support block 31 in such a manner as to be in parallel with each other. A groove 31a is formed in the support block 31. Both of the core chips 32 and 33 have first to third cores 34 to 36. An upper rank gap (namely, a magnetic gap) 37 is provided between the first and second cores 34 and 35 of the upper rank core chip 32. Further, a lower rank gap (namely, a magnetic gap) 38 is provided between the second and third cores 35 and 36 of the lower rank core chip 33.

Moreover, fused glass 39, which is a nonmagnetic material, is placed between the second and third cores 35 and 36 of the upper rank core chip 32 and between the first and second cores 34 and 35 of the lower rank core chip 33, respectively. Furthermore, fused glass regions 40 and 41 are provided at corner portions of the first and third cores 34 and 36, the joint portion between the first and second cores 34 and 35 and the joint portion between the second and third cores 35 and 36, respectively. The fused glass regions 40 are used for reducing sliding noises that are generated by the contact between a ferrite material and a recording medium. Diagonally shaded areas of FIG. 1 indicate the fused glass regions 39 and 40, respectively.

Figure 3:
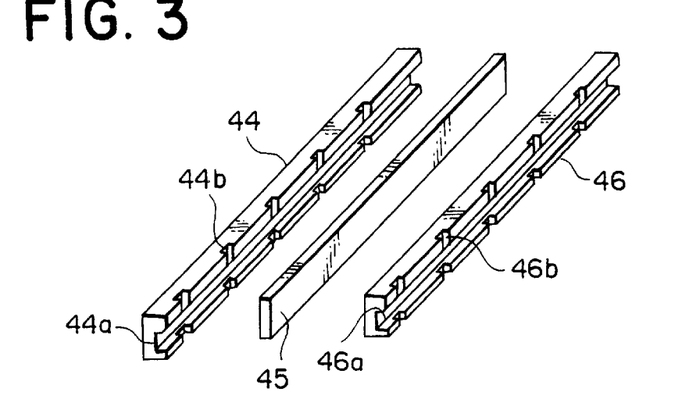
FIG. 3 is a perspective diagram showing the condition of the core assembly of FIG. 1 in the middle of production thereof.

Next, a method of manufacturing the core assembly 30 of FIG. 1 will be described hereinbelow. First, as illustrated in FIG. 3, first to third core materials 44 to 46 respectively corresponding to the first to third cores 34 to 36 are prepared. Coil insertion grooves 44a and 46a are provided along the longitudinal direction of the "C" shaped core materials 44 and 46. Moreover, nonmagnetic space grooves 44b and 46b for placing the fused glass regions 39 are provided in the longitudinal direction at predetermined intervals in the core materials 44 and 46.

The nonmagnetic space grooves 44b and 46b are ground by using a diamond blade or the like. Further, if the depths of the nonmagnetic space grooves 44b and 46b are 20 $\mu$m or so, sufficient magnetic separation therebetween can be achieved. However, the depths of the nonmagnetic space grooves 44b and 46b are set at values which are not less than 100 $\mu$m, with the intention of eliminating the need to pay attention to dimensional accuracy. Moreover, $SiO_2$ films serving as gap materials are formed by sputtering on the joint surfaces of the core materials 44 to 46 in such a manner as to have predetermined thickness. Furthermore, the aforementioned gap material is formed between the first and second core materials 44 and 45 corresponding to the upper rank gap 37 after a metallic film for enhancing the recording ability of the head is formed therebetween by sputtering. In contrast, only a $SiO_2$ film is formed between the second and third core materials 45 and 46 corresponding to the lower rank gap 38.

Figure 4:
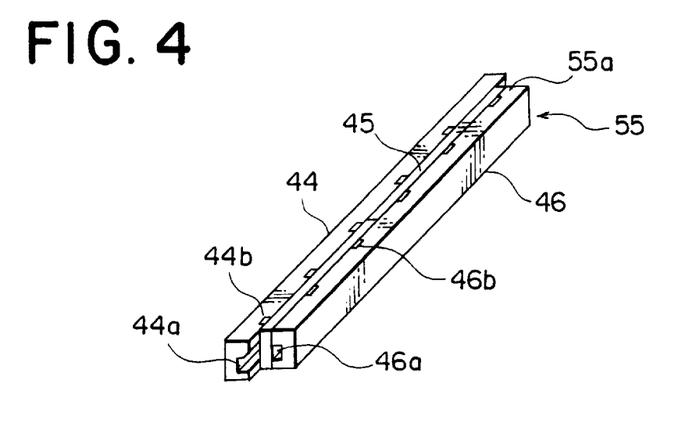
FIG. 4 is a perspective diagram showing the condition of a core material assembly of FIG. 3 assembled from core materials.

Next, as illustrated in FIG. 4, the first and third core materials 44 and 46 are joined to the second core material 45 by the fused glass 41 (see FIG. 2) while positioning the nonmagnetic space grooves 44b and 46b. Thus, a core material having a track surface (namely, the top surface as viewed in FIG. 4) 55a is assembled. At that time, the deposition temperature T1 is set at a value within a range of 500 to 600 degrees centigrade, in which the head can be used as, for example, a Metal-In-Gap (MIG) head without any impediments. Upon completion of the deposition, the bottom surface (namely, the bottom surface as viewed in FIG. 4) is polished. Furthermore, the fused glass regions 39 are deposited in the nonmagnetic space grooves 44b and 46b.

Figure 5:
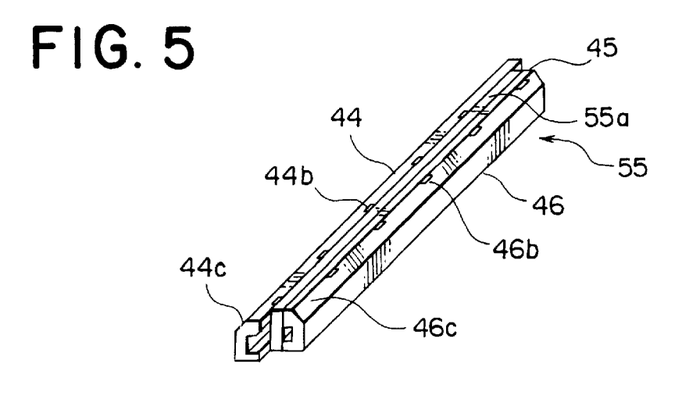
FIG. 5 is a perspective diagram showing the condition of the core material assembly of FIG. 4, on which track surface C processing is performed.

Thereafter, the corner portions of the first and second core materials 44 and 46, which are at the side of the track-surface (55a) are bevelled (namely, the track-surface C-processing). As a result, slope surfaces 44c and 46c are formed by leaving the gap unprocessed, as shown in FIG. 5. Further, instead of bevelling, stage or step portions may be formed by stepped machining. Namely, step-like portions (not shown) may be formed in place of the slope surfaces 44c and 46c. Upon completion of the bevelling, the track surface is ground or polished.

Figure 6:
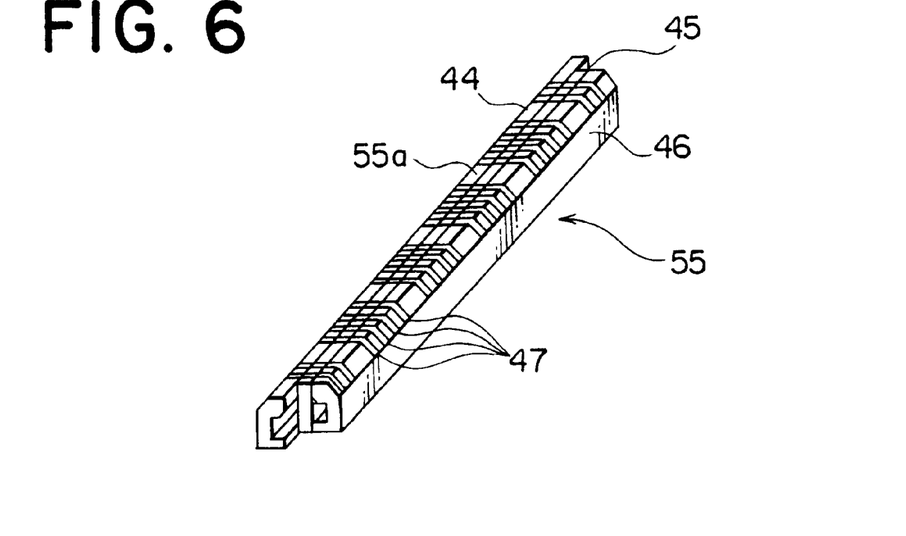
FIG. 6 is a perspective diagram showing the condition of the core material assembly of FIG. 5, in which track grooves are provided.

Thereafter, track grooves 47 as illustrated in FIG. 6 are cut by using a diamond blade. Further, the ferrite portions are left so as to obtain a predetermined track width. Thereby, a plurality of core chips having any track width can be formed in one core material assembly 55.

Figure 7:
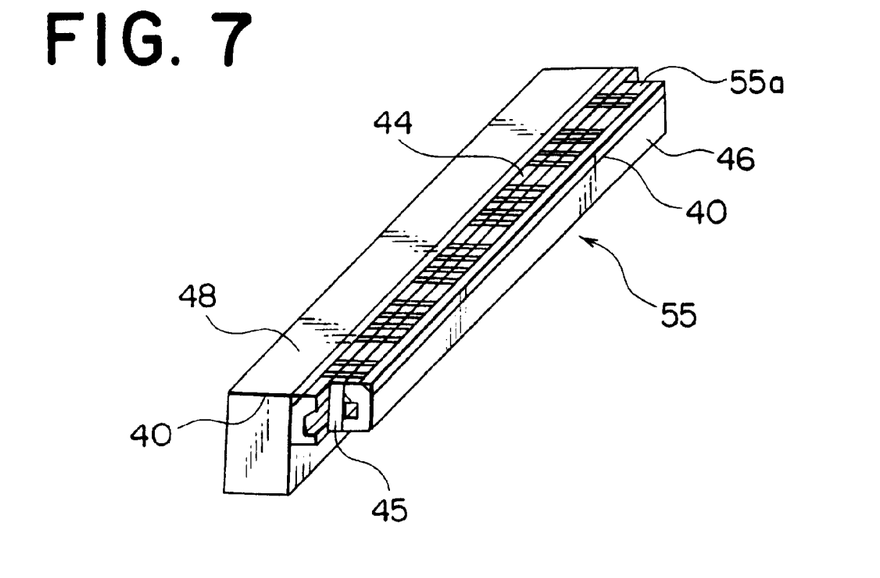
FIG. 7 is a perspective diagram showing the condition of the core material assembly of FIG. 6, which is fixed to a support block material.

Next, as shown in FIG. 7, the first core material 44 is brought into an abutting engagement with the support block material 48 made of a nonmagnetic material such as a ceramic. Further, the fused glass 40 (see FIG. 2) is put on the joint portion thereof and is deposited thereon at a temperature $T_2$. At that time, the track grooves 47 are sealed by the fused glass 40. Thereby, the first core material 44 is joined to the support block material 48. Moreover, a spacer (not shown) is brought into abutting engagement with the third core material 46. The fused glass 40 is also deposited onto the slope surface 46c. Incidentally, it is preferable that the temperature $T_2$ be set at a value within a range of from $(T_1—50)$ to $(T_1—150)$ degrees centigrade.

Figure 8:
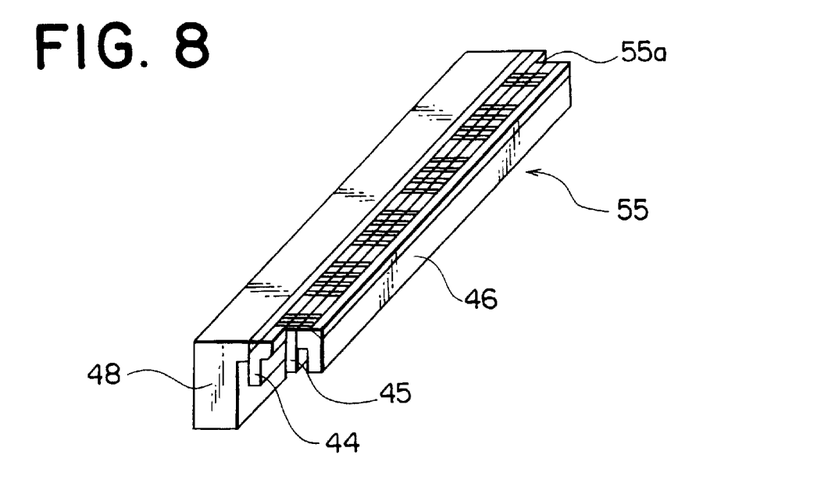
FIG. 8 is a perspective diagram showing the condition of the core material assembly of FIG. 7, on which foot groove processing is performed.
Figure 9:
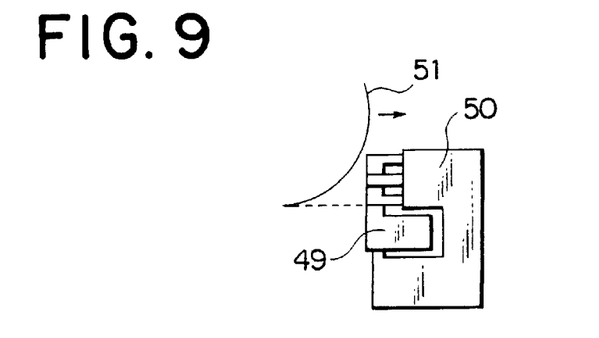
FIG. 9 is a diagram for illustrating the manner of performing light or optical groove processing on the assembly of FIG. 8.
Figure 10:
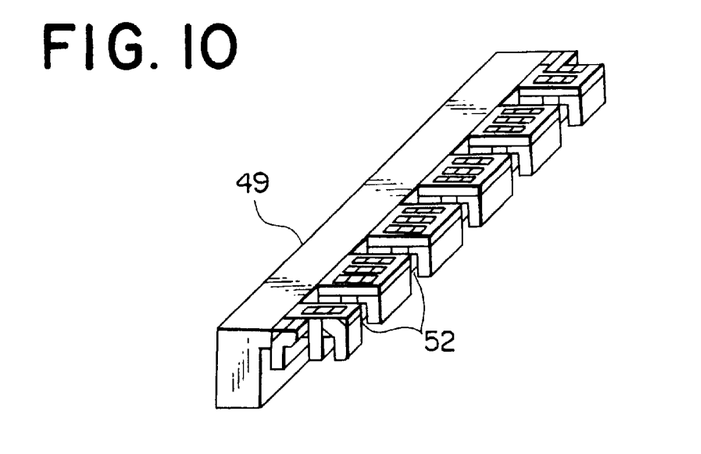
FIG. 10 is a perspective diagram showing the condition of the assembly of FIG. 8, which is achieved after performing the light groove processing.

Thereafter, as shown in FIG. 8, at the bottom surface side of the first and third core materials 44 and 46, the joint portion between the first and second core materials 44 and 45 and the joint portion between the second and third core materials 45 and 46 are cut off (namely, the foot groove processing is performed). Moreover, the track surface grinding is performed, so that the gap depth (see GD in FIG. 2) is adjusted to a predetermined value. Subsequently, as illustrated in FIG. 9, the assembly 49, which is in the middle of the production thereof, is attached to a core processing jig 50. Moreover, the light groove processing is performed by using a diamond blade 51. As a result of this light groove processing, a groove 52 as shown in FIG. 10 is provided in the assembly 49, which is in the middle of the production thereof. This groove 52 is operative to magnetically separate the upper rank core chip 32 from the lower rank core chip 33 as illustrated in FIG. 1. Furthermore, when the complex magnetic head is used by in combination with a detection head of an optical system, this groove 52 permits laser light for the optical servo system to pass therethrough.

Figure 11:
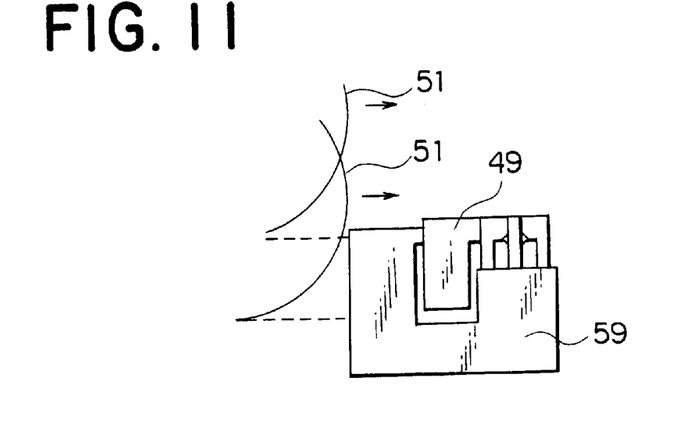
FIG. 11 is a diagram for illustrating the manner of cutting the assembly of FIG. 10 into each core assembly.
Figure 12:
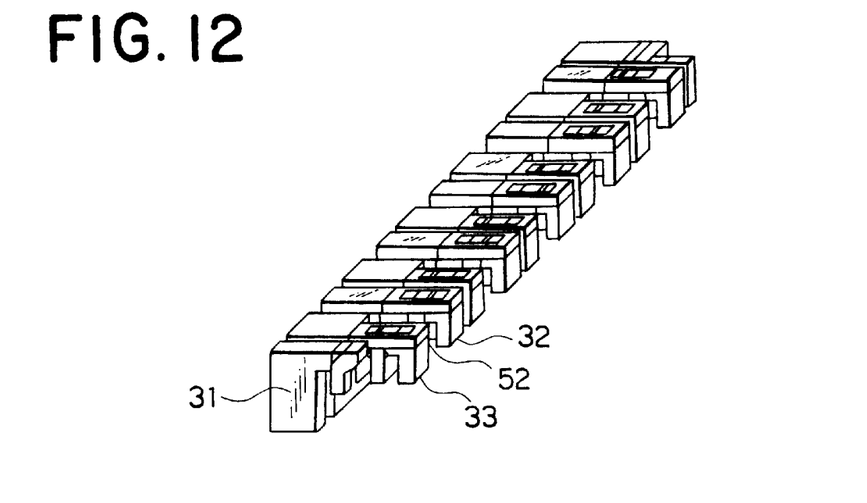
FIG. 12 is a perspective diagram showing the condition of the assembly of FIG. 10, which is achieved after cutting into each core assembly.
Figure 13:
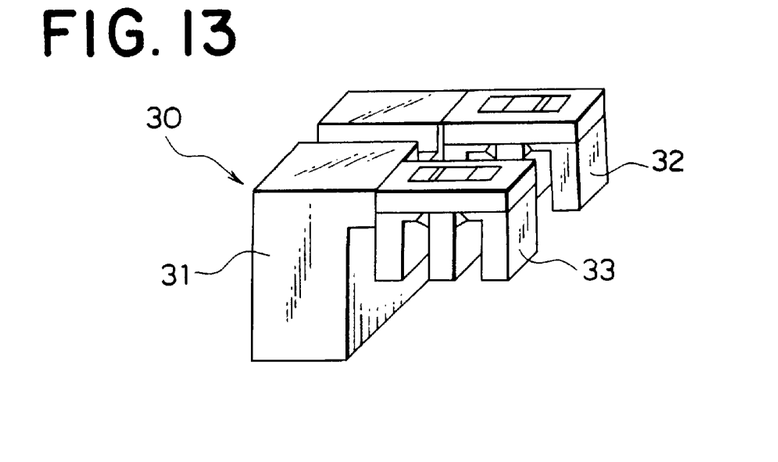
FIG. 13 is a perspective diagram showing one of the core assemblies of FIG. 12.

Next, an angle, which the core processing jig 50 forms with the diamond blade 51, is altered as illustrated in FIG. 11. Thus, the groove 31a of FIG. 1 is provided in the support block material 48. Further, as shown in FIG. 12, a single assembly 49 is cut into individual core assemblies 30. A plurality of slits (not shown), which permit a plurality of diamond blades 51 arranged at predetermined intervals to go therethrough, are provided in the core processing jig 50. FIG. 13 is a perspective view of the core assembly 30.

A plurality of core assemblies 30 can thus be simultaneously manufactured by this manufacturing method. Moreover, in each of the core assemblies 30, the upper rank core chip 32 and the lower rank core chip 33 are simultaneously manufactured and positioned to thereby improve assembly accuracy. Further, the performance of the magnetic head is enhanced and the assembly time is considerably decreased.

Figure 14:
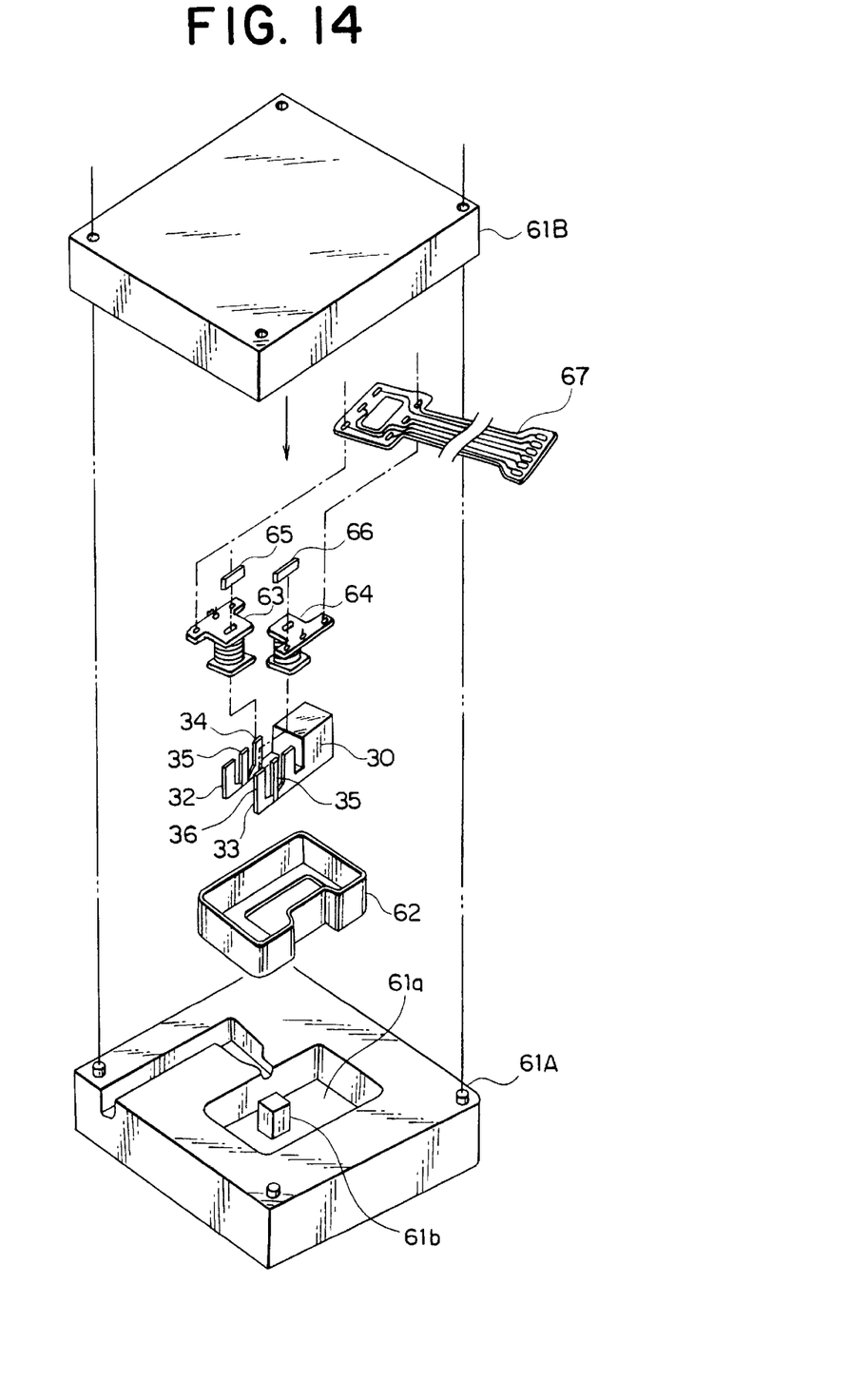
FIG. 14 is an exploded perspective diagram for illustrating a method of sealing the core assembly of FIG. 13 by using resin.

Next, a method of assembling the complex magnetic head having the aforementioned core assemblies 30 will be described hereunder. A shielding cup 62 and the core assembly 30 are placed in a recessed portion 61a of a lower mold 61A as illustrated in FIG. 14. Further, two coils 63 and 64 are inserted in the core assembly 30. At that time, the coil 63 for the upper rank core chip 32 is inserted into the first core 34, while the coil 64 for the lower rank core chip 33 is inserted into the third core 36. Subsequently, an end core 65 is pressurized and bonded between the bottom surfaces of the first and second cores 34 and 35 of the upper rank core chip 32, while an end core 66 is pressurized and bonded between the bottom surfaces of the second and third cores 35 and 36 of the lower rank core chip 33. Furthermore, an FPC (namely, a flexible printed circuit (board)) 67 is connected to the coils 63 and 64.

Figure 15:
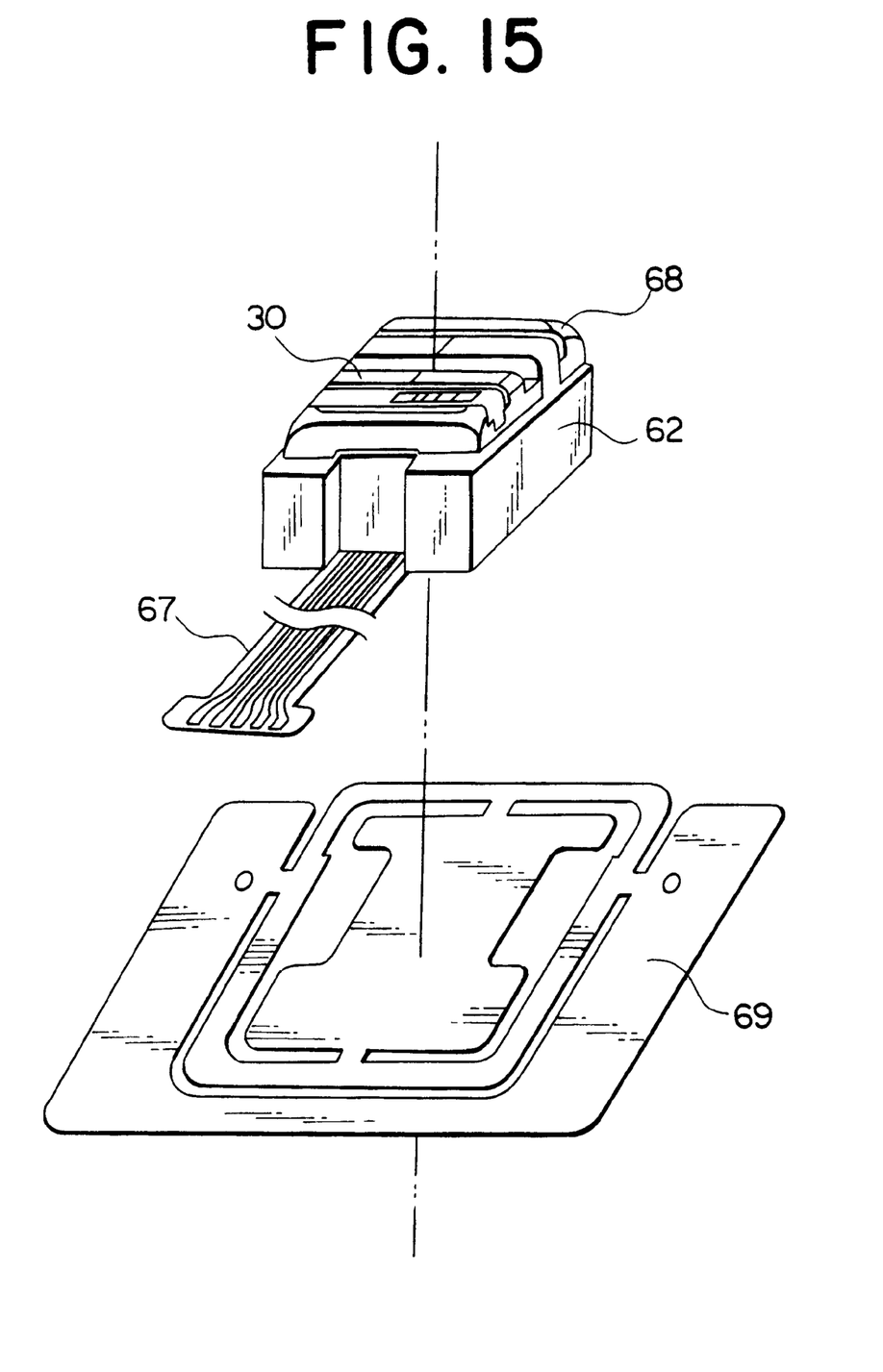
FIG. 15 is an exploded perspective diagram showing the condition in which the slider is put on a gimbal spring after being sealed by resin.

Thereafter, the upper mold 61B is closed, and thermosetting resin is injected into the recessed portion 61a. The molds 61A and 61B are preliminarily heated to a predetermined temperature within a range of from 130 to 180 degrees centigrade. The thermosetting resin set in the molds 61A and 61B after a predetermined time lapses (namely, 50 to 200 sec). At that time, the thermosetting resin fills the gaps between parts contained in the recess portion 61a, so that complex slider 68, which is strongly resin-sealed, is assembled as illustrated in FIG. 15.

Further, when molding, the FPC 67 is pulled outside of the molds 61A and 61B. Thus, the sealing materials (not shown) such as silicon rubber can be provided on the joint surface between the mold 61A and the FPC 67 and between the mold 61B and the FPC 67, respectively, and thus, the thermosetting resin is prevented from flowing out of the molds and adhering to the FPC 67. Thereby, the flexibility of the FPC 67 is ensured. Moreover, the electrical connection portion is prevented from being covered with resin.

Incidentally, a mixture obtained by mixing epoxy (principal material: multifunctional epoxy, curing agent: phenol-borax) with molten silica or alumina, which serves as a filler, is used as the thermosetting resin. Furthermore, the epoxy is further mixed with a mold releasing agent such as wax so as to reduce the adhesion or adhesiveness between the thermosetting resin and the core assembly 30.

Upon completion of the aforementioned resin sealing, the slider 68 is taken out of the molds 61A and 61B, and a surface thereof, which makes contact with a recording medium, is ground and polished. Thereafter, the complex magnetic head is assembled by being positioned onto a gimbal spring 69, as shown in FIG. 15.

Figure 16:
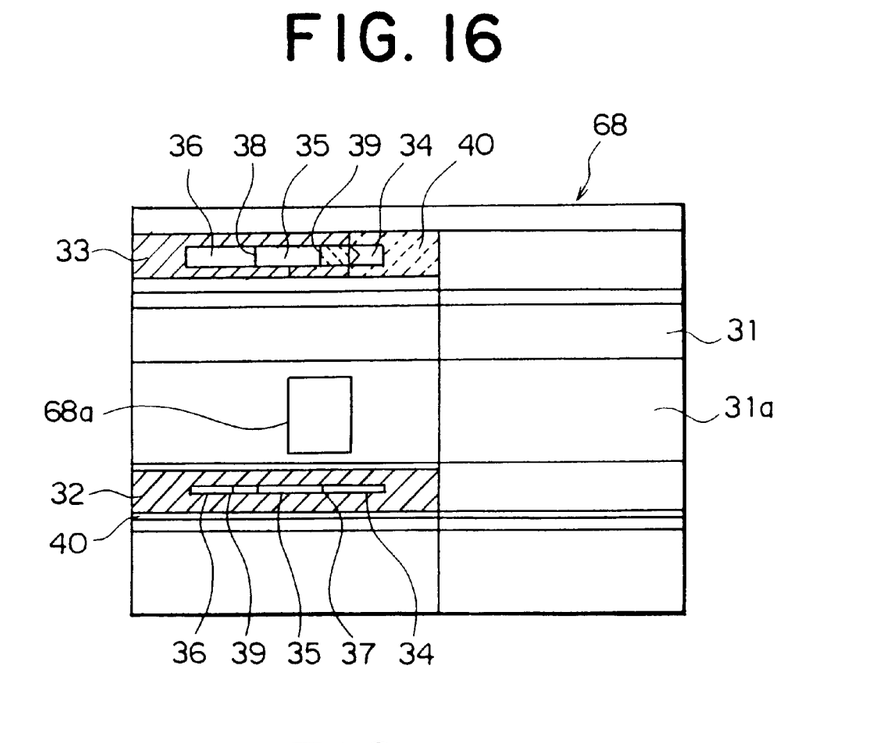
FIG. 16 is a plan diagram showing the condition of the slider of FIG. 15, from which a shield cup and FPC are removed.
Figure 17:
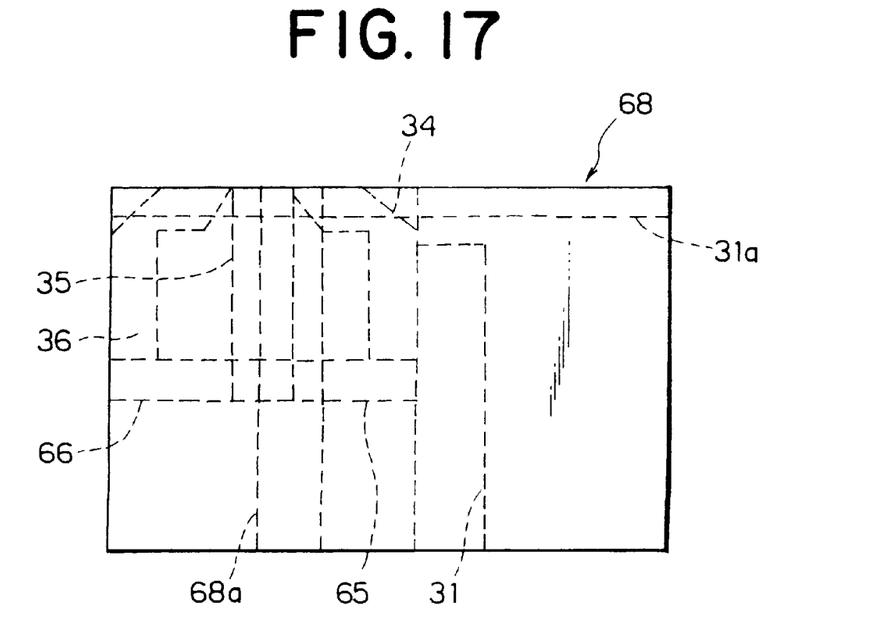
FIG. 17 is a front view of the slider of FIG. 16.
Figure 18:
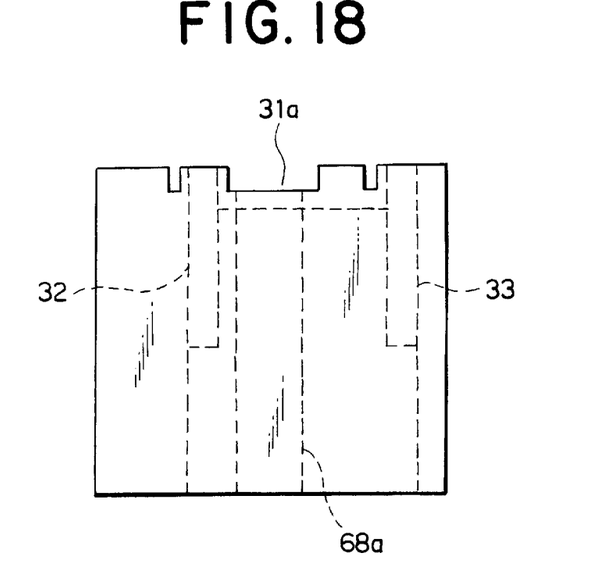
FIG. 18 is a right side view of the slider of FIG. 17.

FIG. 16 is a plan diagram showing the condition of the slider 68 of FIG. 15, from which the shield cup 62 and the FPC 67 are removed. FIG. 17 is a front view of the slider of FIG. 16. FIG. 18 is a right side view of the slider of FIG. 17. Diagonally shaded areas of FIG. 1 indicate the fused glass regions 39 and 40, respectively. In the slider 68, a hole 68a is bored which permits laser light for the optical servo system to pass therethrough when the complex magnetic head is used in combination with a detection head of the optical system. As a result of providing a protruding portion 61b in the recessed portion 61a of the lower mold 61A, this hole 68a may be formed simultaneously with the molding. Moreover, the groove 31a is used for improving the contact between a recording medium and a complex magnetic head.

Figure 19:
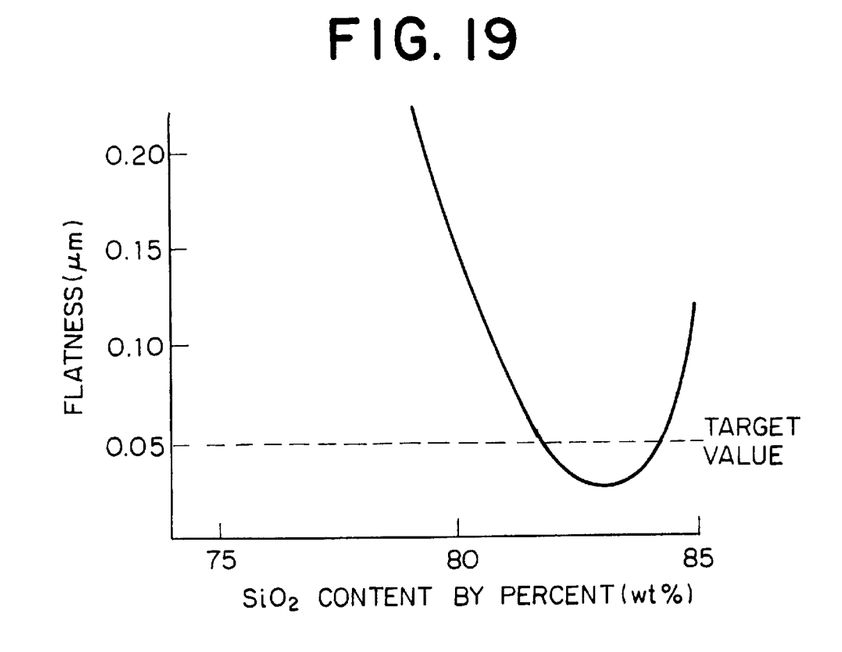
FIG. 19 is a graph showing the relation between the $SiO_2$ content by percent of thermosetting resin used for the resin sealing illustrated in FIG. 14 and the flatness of the slider.
Figure 20:
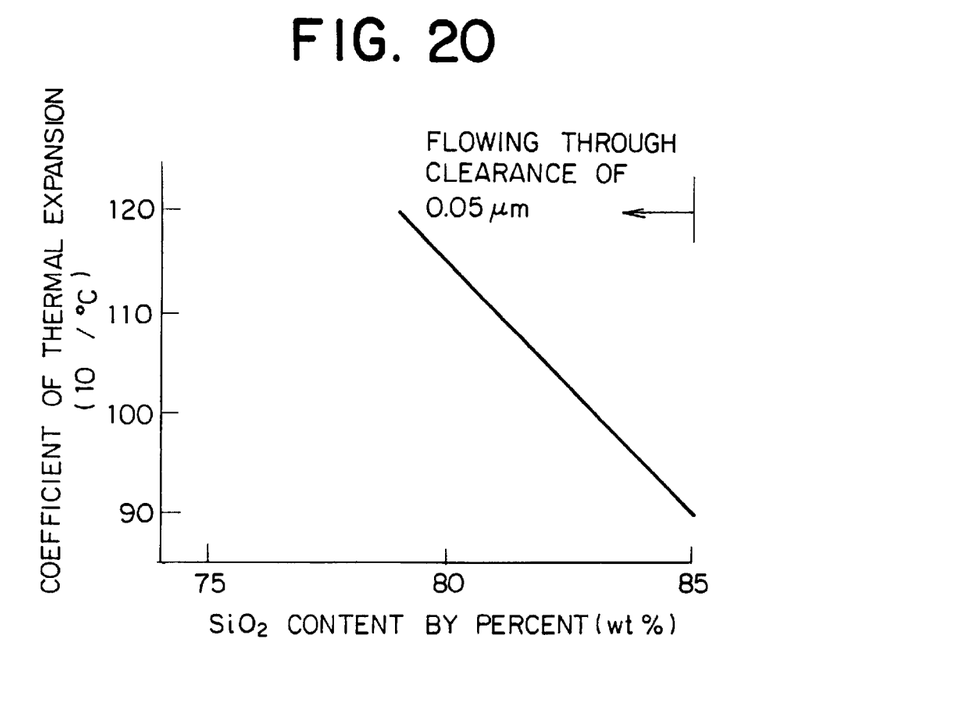
FIG. 20 is a graph showing the relation between the $SiO_2$ content by percent of the resin and the coefficient of thermal expansion thereof.

Referring next to FIG. 19, there is shown a graph which illustrates the relation between the $SiO_2$ content by percent of thermosetting resin used for the resin sealing and the flatness of the slider. FIG. 2) is a graph showing the relation between the $SiO_2$ content by percent of the resin and the coefficient of thermal expansion thereof. In order to set both the minimum clearance into which the thermosetting resin flows, and the slider flatness as 0.05 $\mu$m or less it is preferable that a mixture obtained by mixing the epoxy resin with 82 to 84 wt % of $SiO_2$ fine particles be used as the thermosetting resin.

Furthermore, fine particles of a material other than $Al_2O_3$ may be used as the filler, as long as such fine particles are hard. Incidentally, regarding the coefficient of thermal expansion, it is preferable for suppressing distortion, which is caused by the difference in the coefficient of thermal expansion, that the coefficient of thermal expansion of the thermosetting resin is within a range of ±5% of the coefficient of thermal expansion of the ferrite. Moreover, when further mixed with the mold releasing agent, it becomes difficult for the microscopic contraction or shrinkage stress of the thermosetting resin to exert an effect on the ferrite. Thus, deterioration of the magnetic characteristics of the ferrite in suppressed.

In the case of the aforementioned complex magnetic head, the gap depths GD of the gaps 37 and 38 are adjusted to the set values, respectively, by performing the grinding and polishing. However, the two core chips 32 and 33 are fixed to the support block 31. Thus, when assembling the slider 68, one of the gap depths GD is simultaneously adjusted by managing the other gap depths. Thereby, when assembling the slider 68, it is unnecessary to reduce variation in height of the core assembly 30. Moreover, as the accuracy of the gap depth GD is enhanced, there is a reduction in the level of defects.

Furthermore, since the parts such as the core assembly 30 are made to be integral with one another by being resin-sealed by the thermosetting resin, the number of parts can be reduced. Moreover, as the number of production steps can be decreased, productivity is improved.

Second Embodiment

Figure 21:
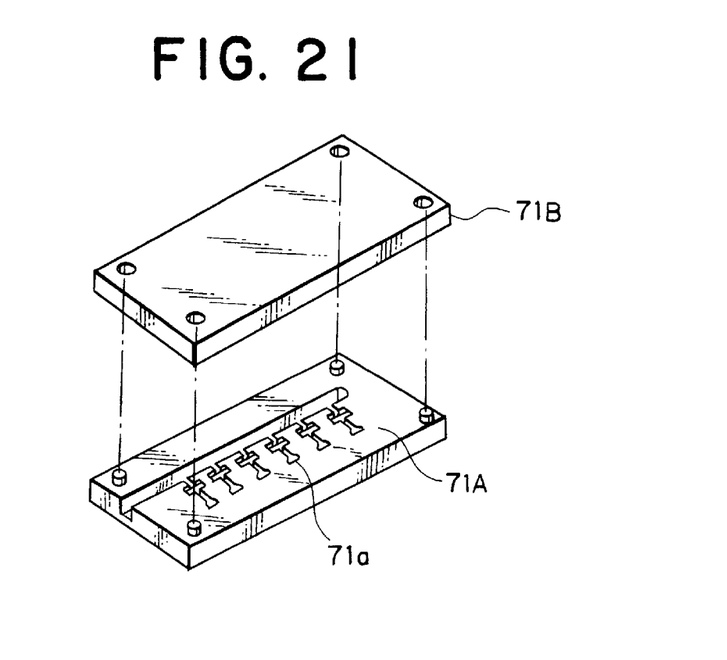
FIG. 21 is a perspective diagram illustrating a metallic mold used in a method of manufacturing a complex magnetic head which is a second embodiment of the present invention.

Although in the case of the aforementioned first embodiment, a single complex magnetic head is resin-sealed by one set of molds 61A and 61B, molds 71A and 71B, which have a plurality of recessed portions 71a and are adapted to simultaneously resin-seal a plurality of complex magnetic heads, as illustrated in FIG. 21, may be used. Thus, the yield of materials of the thermosetting resin is enhanced and productivity is improved.

Third Embodiment

Further, in the case of the aforementioned first embodiment, when the slider 68 is resin-sealed, the shielding cup 62 and the FPC 67 are simultaneously made to be integral with the slider 68. However, the shielding cup 62 may be bonded to the slider 68 after the resin sealing thereof. Moreover, the FPC 67 may be soldered thereto after the resin sealing thereof.

Fourth Embodiment

Figure 22:
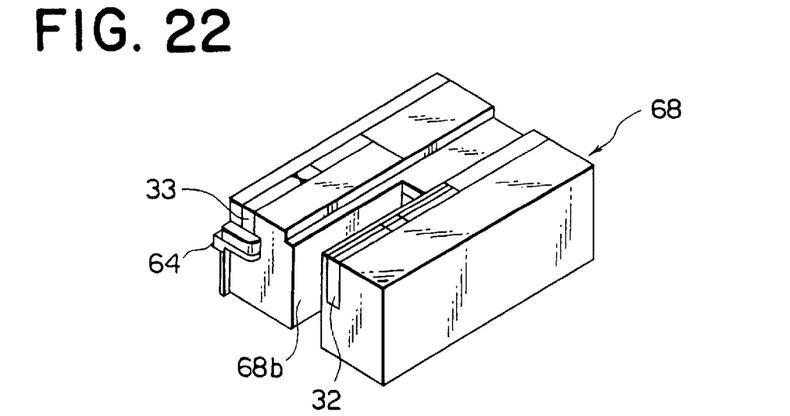
FIG. 22 is a perspective diagram illustrating a primary part of a complex magnetic head which is a fourth embodiment of the present invention.

Additionally although in the case of the aforementioned first embodiment, the hole 68a is provided in the slider 68 by providing the protruding portion 61b in the lower mold 61A, the hole 68a may be provided by machining after the resin sealing is performed. Furthermore, a notch 68b as shown in FIG. 22 may be provided instead of a hole 68a.

Fifth Embodiment

Furthermore, although the case of the aforementioned first embodiment, the slider 68 is bonded and fixed after performing the resin sealing the molding may be performed after the slider 68 is bonded to the gimbal 69.

Although the preferred embodiments of the present invention have been described above, it should be understood that the present invention is not limited thereto and that other modifications will be apparent to those skilled in the art without departing from the spirit of the invention.

What is claimed is:

1. A complex magnetic head comprising:
    a core assembly including
        a support block made of a nonmagnetic material and having a side surface on a perimeter of said support block,
        upper and lower rank core chips spaced and fixed to said support block in such a manner as to be in parallel with each other,
        said upper and lower rank core chips being fixed to the same side surface of said support block,
        each of said upper and lower rank core chips having first, second and third cores, with magnetic gaps, whose track widths are different from each other,
        wherein said first, second, and third cores of said upper rank core chip are directly opposite said first, second, and third cores of said lower rank core chip, respectively,
        said magnetic gaps including a first magnetic gap being provided between said first and second cores of one of said upper and lower rank core chips and a second magnetic gap being provided between said second and third cores of the other of said upper and lower rank core chips, respectively;
    a pair of coils respectively inserted into said upper and lower rank core chips; and
    a pair of back cores respectively joined to said upper and lower rank core chips.

2. The complex magnetic head according to claim 1, wherein nonmagnetic materials are interposed between said second and third cores of said core chip having the magnetic gap provided between said first and second cores thereof and between said first and second cores of said core chip having the magnetic gap provided between said second and third cores thereof, respectively.

3. The complex magnetic head according to claim 1, wherein a groove extending in parallel with said upper and lower rank core chips is provided in a surface portion, which is opposite to a recording medium, of said support block.

4. The complex magnetic head according to claim 1, wherein said core assembly, said coils and said back cores are resin-sealed by a thermosetting resin.

5. The complex magnetic head according to claim 4, wherein a hole or a notch for permitting laser light for an optical servo system to pass therethrough, is provided between said upper and lower core chips.

6. The complex magnetic head according to claim 4, wherein said thermosetting resin is a resin obtained by mixing an epoxy resin with 82 to 84 wt % of $SiO_2$ fine particles.

7. The complex magnetic head according to claim 4, wherein said thermosetting resin is mixed with a mold releasing agent.

* * * * *